(12) United States Patent
Rietzler

(10) Patent No.: US 7,878,561 B2
(45) Date of Patent: Feb. 1, 2011

(54) SEAL DEVICE

(75) Inventor: Manfred Rietzler, Marktoberdorf (DE)

(73) Assignee: Smartrac IP B.V., Amsterdam (NL)

( * ) Notice: Subject to any disclaimer, the term of this patent is extended or adjusted under 35 U.S.C. 154(b) by 105 days.

(21) Appl. No.: 10/593,046

(22) PCT Filed: Dec. 19, 2005

(86) PCT No.: PCT/DE2005/002282

§ 371 (c)(1),
(2), (4) Date: Sep. 15, 2006

(87) PCT Pub. No.: WO2006/066555

PCT Pub. Date: Jun. 29, 2006

(65) Prior Publication Data

US 2007/0139196 A1 Jun. 21, 2007

(30) Foreign Application Priority Data

Dec. 23, 2004 (DE) .................. 10 2004 063 487

(51) Int. Cl.
*G09F 3/03* (2006.01)
(52) U.S. Cl. ............... 292/307 R; 292/317; 292/307 B; 292/307 A
(58) Field of Classification Search ............. 292/307 R, 292/315–307 B; 340/539.1, 568, 542, 556, 340/572.9, 568.2
See application file for complete search history.

(56) References Cited

U.S. PATENT DOCUMENTS

| 3,712,655 | A | | 1/1973 | Fuehrer ................... 292/321 |
| 5,097,253 | A | | 3/1992 | Eschbach et al. ............ 340/545 |
| 5,836,002 | A | * | 11/1998 | Morstein et al. .......... 340/568.1 |
| 6,002,343 | A | | 12/1999 | Auerbach et al. ........ 340/825.54 |
| 6,069,563 | A | * | 5/2000 | Kadner et al. ............... 340/571 |
| 6,265,973 | B1 | * | 7/2001 | Brammall et al. ......... 340/568.1 |
| 6,420,971 | B1 | * | 7/2002 | Leck et al. .................. 340/542 |

(Continued)

FOREIGN PATENT DOCUMENTS

DE 692 09 851 T2 9/1996

(Continued)

OTHER PUBLICATIONS

International Preliminary Report on Patentability, date of issuance Sep.18, 2007, including Written Opinion of the International Searching Authority for International Application No. PCT/DE2005/002282 (7 pages total).

*Primary Examiner*—Lloyd Gall
*Assistant Examiner*—Mark Williams
(74) *Attorney, Agent, or Firm*—Proskauer Rose LLP

(57) ABSTRACT

A seal device (20) with a seal body (21) and an attachment device (22) for the captive attachment of the seal body to an object to be sealed, wherein one end of the attachment device is connected in a single piece with the seal body while its other end comprises a joining device (26) for non-positive joining to a connection device (27) that is provided on the seal body, wherein the seal body comprises a data carrier that comprises a data transmission device (32), which data carrier is designed as a switching circuit (23), wherein the switching circuit comprises an external circuit bridge (25) which for the purpose of connecting two connection points (29) of the switching circuit leads through the attachment device.

15 Claims, 3 Drawing Sheets

U.S. PATENT DOCUMENTS

Figure 1:
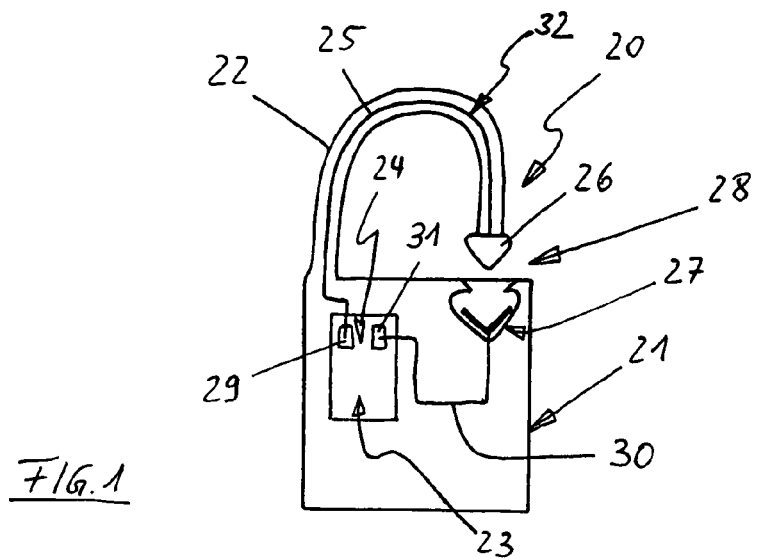

| | | | |
|---|---|---|---|
| 6,778,083 B2 * | 8/2004 | Auerbach et al. | 340/539.1 |
| 6,958,698 B2 * | 10/2005 | Maloney | 340/572.8 |
| 7,042,354 B2 * | 5/2006 | Auerbach et al. | 340/539.31 |
| 2003/0052782 A1 | 3/2003 | Maloney | 340/568.4 |

FOREIGN PATENT DOCUMENTS

| | | |
|---|---|---|
| DE | 295 21 243 U1 | 12/1996 |
| DE | 298 13 738 UI | 4/1999 |
| EP | 0 978 812 A2 | 2/2000 |
| EP | 0978812 A2 | 2/2000 |
| EP | 1 171 330 B1 | 6/2004 |
| GB | 2 368 174 A | 4/2002 |

* cited by examiner

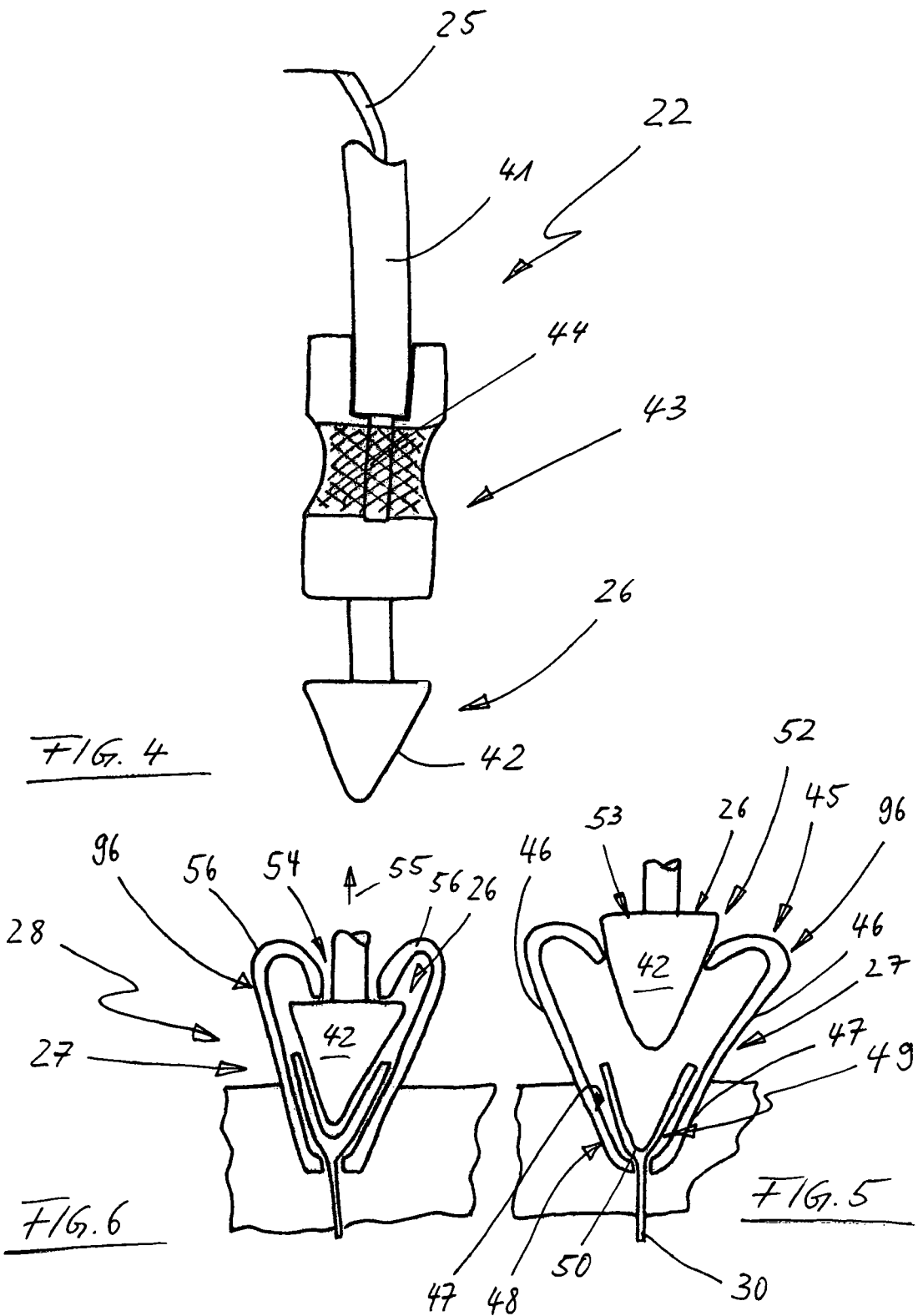

SEAL DEVICE

RELATED APPLICATIONS

This application is a national stage application of International Application No. PCT/DE2005/002282 filed Dec. 19, 2005, which claims priority to German Patent Application No. DE 10 2004 063 487.4 filed Dec. 23, 2004, the contents of which are incorporated herein by reference in their entirety.

The present invention relates to a seal device with a seal body and an attachment device for the captive attachment of the seal body to an object to be sealed, wherein one end of the attachment device is connected in a single piece with the seal body while its other end comprises a joining device for non-positive joining to a connection device provided on the seal body.

Seal devices of the type mentioned in the introduction are well known; often they are referred to as "leaden seals" or "leading". In such leaden seals the joining device for non-positive joining of the attachment device to the seal body is frequently designed as a non-separable snap-in connection which, while making possible easy locking of the joining device to a connection device that is designed so as to be complementary on the seal body, at the same time makes non-destructive undoing of this connection impossible. In this way the known leaden seals make it possible to visually verify the integrity of said leaden seal.

In particular if a large number of sealed objects that have been sealed with conventional leaden seals have to be verified, the inspection to verify the integrity of each leaden seal involves very considerable expenditure. Furthermore, depending on the design of conventional leaden seals, manipulation on a broken leaden seal, which manipulation is to pretend that the integrity of the leaden seal is maintained, is not completely excluded but is often only a question of the effort involved in connection with carrying out the manipulation.

It is the object of the present invention to propose a seal device which not only makes it possible to verify the integrity of the seal device more easily, but which also excels by the enhanced security it provides against manipulation.

This object is achieved by a seal device with the characteristics of claim 1.

In the seal device according to the invention the seal body comprises a data carrier with a data transmission device, which data carrier is designed as a switching circuit, wherein the data carrier comprises an external circuit bridge which for the purpose of connecting two connection points of the switching circuit leads through the attachment device.

As a result of establishing the non-positive connection between the joining device of the attachment device and the connection device provided on the seal body an electrical contact between the connection points of the switching circuit is closed. Opening the electrical contact thus leads to interruption of a contact bridge of the switching circuit and to generating a data change on the data carrier, which data change can be read out from the outside by way of the data transmission device. Depending on the design of the switching circuit, the data change can be of a temporary nature, in other words it can apply only while the contact bridge is interrupted, or it can be of a permanent nature such that the data change that has taken place due to an interruption in the contact bridge remains even after the contact has been restored, in other words the switching circuit has a memory effect. In particular in the latter case this provides the option that even after manipulation on the seal device has been carried out and the external circuit bridge has been restored, during data access to the data carrier by way of the data transmission device the manipulation is documented. Because of this the seal device according to the invention is practically tamper-proof.

According to an advantageous embodiment the switching circuit is an integrated circuit, preferably a chip. Constructing the switching circuit as a chip makes possible particularly simple integration of the switching circuit in the seal body, for example by means of encapsulation of the chip embodied as a seal body, or encapsulation of a chip module that accommodates the chip.

An advantageous embodiment of the circuit bridge as a wire-shaped conductor makes it possible to design the circuit bridge so that it especially takes into account the function of the attachment device that accommodates the circuit bridge for reattachment to an object to be sealed. In this context the term "wire-shaped" does not refer to the design of the circuit bridge in the manner of a conventional wire; instead the term "wire-shaped" implies an elongated directional design of the electrical conductor in the manner of a wire. Thus, on the one hand the circuit bridge can indeed be designed as a wire sheathed with insulation material. On the other hand it is for example also possible to incorporate conductive particles in an attachment device made of plastic, at least in the region of a through-fiber, so as to implement an electrical conductor.

In a possible embodiment of the seal device the switching circuit is connected to an energy supply device that is integrated in the seal device, and the data transmission device is made from a data access contact arrangement that is arranged on the outside of the seal body. This embodiment provides the possibility of contact-establishing access to the data of the data carrier from the outside without there being any need for an external energy supply of the switching circuit for exporting data to a reading device.

In an alternative embodiment of the seal device the switching circuit comprises an antenna device that is arranged in the seal device, which antenna device is used both as a data transmission device and as a connection to an external energy supply device. In this way non-contacting access to the data of the data carrier becomes possible, wherein in addition, due to the fact that no internal energy supply device is needed, a particularly high degree of miniaturization and thus a correspondingly small and furthermore light design of the seal body becomes possible.

In an embodiment with a particularly simple design of the seal device the circuit bridge is connected in series with the antenna device. In this embodiment external data access by way of the data transmission device designed as an antenna device after separation of the circuit bridge as a result of a broken seal is no longer possible so that a broken seal is indicated in that there is no longer an antenna signal.

In the above-mentioned embodiment in a particularly advantageous way the circuit bridge itself can act as part of the antenna device so that the circuit bridge quasi forms a section of the winding of the antenna device.

In a further embodiment of the seal device the circuit bridge is parallel connected to the antenna device so that even after separation of the circuit bridge an antenna signal is present and data transmission can thus take place independently of the condition of the seal device.

Furthermore, an embodiment of the seal device is possible such that the circuit bridge is connected in series with a second antenna device so that separating the circuit bridge has a direct effect on the working range of the antenna signal. In the above-mentioned embodiment, too, it is possible to design the circuit bridge as part of an antenna device, i.e. so that it is formed from a section of the winding of the antenna device.

To establish an electrically safe contact device that can be produced without the need to use tools, between the joining device at the end of the attachment device and the connection device on the seal body it is advantageous if the contact device is a snap-in connection device.

In order to make possible visual inspection of the integrity of the seal, which visual inspection is undertaken parallel to monitoring the integrity of the seal on the basis of an electrical signal, it is advantageous if the contact device, irrespective of the way it has been designed, is constructed as a non-separable connection.

In order to be able to prevent any undesirable restoration of the seal function by restoring the contact device between the joining device of the attachment device and the connection device of the seal body it is particularly advantageous if the joining device and/or the connection device comprise(s) a deformation part which during separation of the contact device deforms such that restoration of the non-positive connection between the joining device of the attachment device and the connection device of the seal body is not possible.

If the attachment device is constructed as a wire conductor a particularly simple design of the attachment device is possible because the wire conductor serves both as an electrical circuit bridge and a mechanical attachment element for attaching the seal body to the object to be sealed.

A particularly simple design of the entire seal device becomes possible if the attachment device is made from a single-piece extension of the seal body, because in this way production of the attachment device and of the seal body can take place in one common forming procedure.

If the attachment device comprises a circuit bridge that is formed from a conductive plastic, the construction of the attachment device can take place in a single piece with the seal body by way of the addition of conductive particles to the plastic compound intended for producing the attachment device.

Particularly good protection against restoration of the electrical conductor function after separation of the circuit bridge is achieved if, in order to form the circuit bridge, the attachment device comprises a multitude of electrically conductive fibers so that restoration of all fiber connections after separation of the attachment device is made practically impossible.

Below, preferred embodiments of the seal device are explained in more detail with reference to the drawing.

Figure 2:
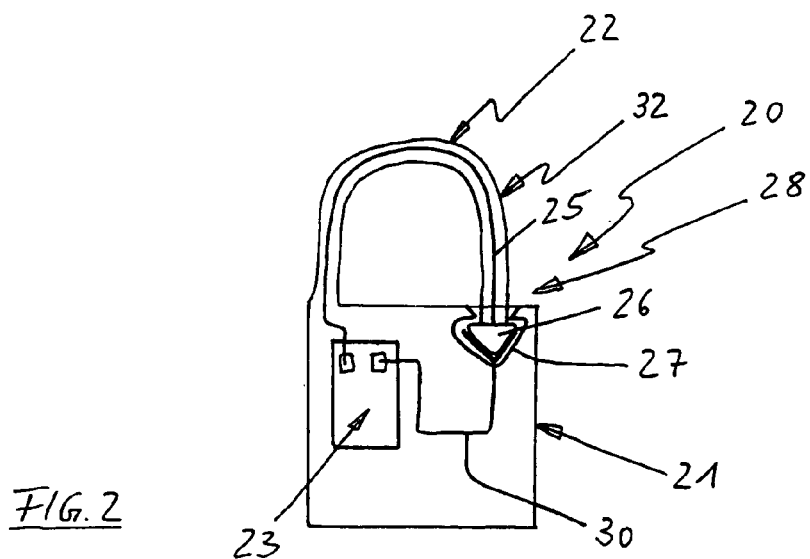
Figure 3:
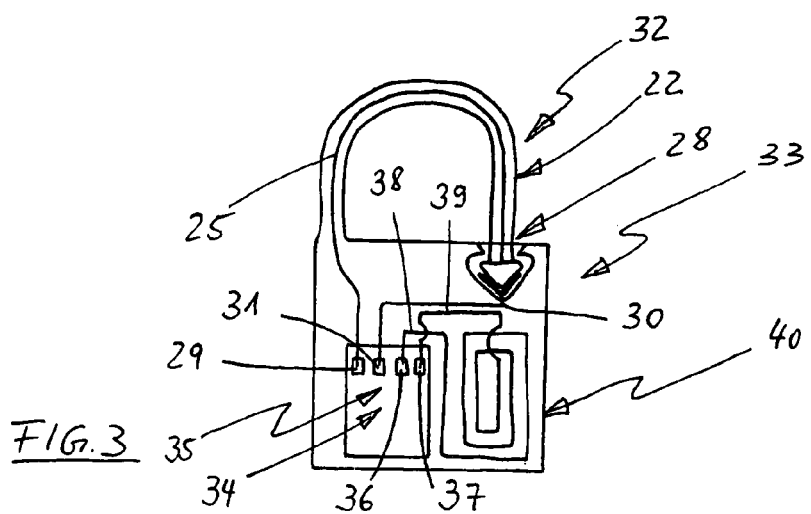
Figure 7:
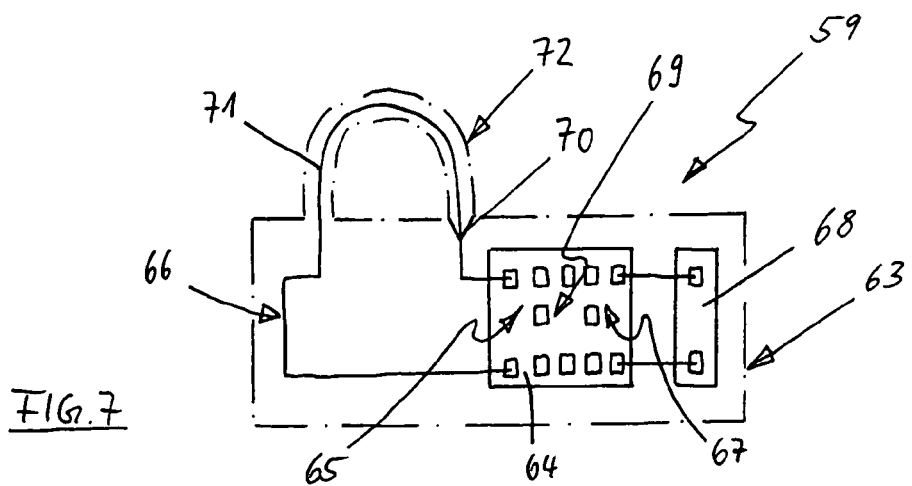
Figure 8:
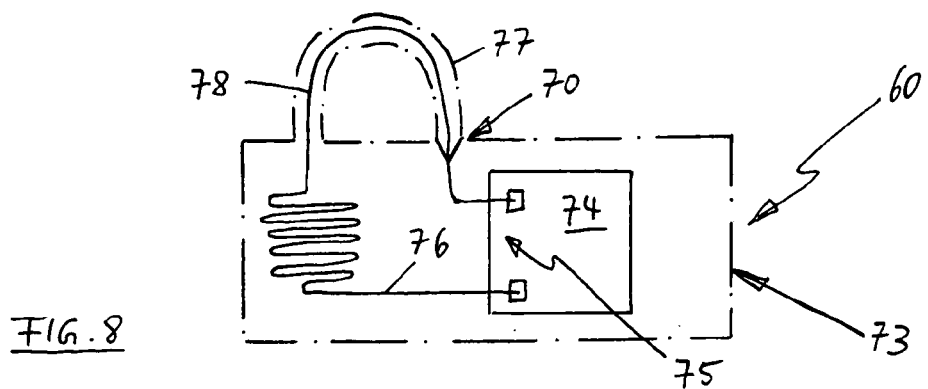
Figure 9:
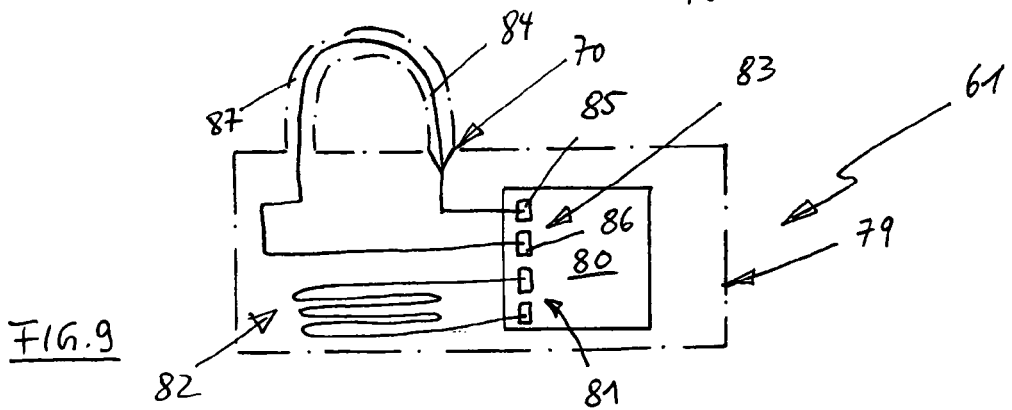
Figure 10:
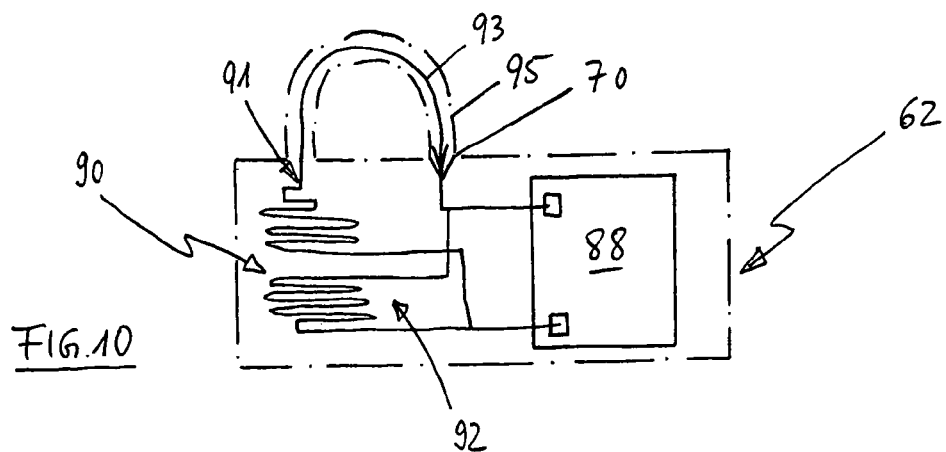

The following is shown:

FIG. 1 a seal device comprising an attachment device arranged on the seal body and comprising an open contact device;

FIG. 2 the seal device shown in FIG. 1 with the contact device closed;

FIG. 3 a further embodiment of a seal device with the contact device closed;

FIG. 4 a joining device provided on the free end of an attachment device;

FIG. 5 a joining device during insertion in a connection device, provided on the seal body, to form a closed contact device;

FIG. 6 the closed contact device;

FIG. 7 a diagrammatic illustration of a seal device comprising a chip module to form a data carrier and an external contact device, arranged on the chip module, as a data transmission device;

FIG. 8 a diagrammatic illustration of a further seal device comprising a chip module as a data carrier and an antenna device as a data transmission device;

FIG. 9 a further embodiment of a seal device comprising a chip module as a data carrier and an antenna device as a data transmission device; and FIG. 10 a diagrammatic illustration of a further seal device comprising a chip module as a data carrier and an antenna device as a data transmission device.

FIG. 1 shows a seal device 20 with a seal body 21 and an attachment device 22. In the simple embodiment shown, the seal device 20 comprises the following electrical components: a chip module 23, arranged in the seal body 21, with a chip (not shown in detail in the drawing) and a contact surface arrangement 24; a wire conductor 25 which, in order to form a circuit bridge, is arranged in the attachment device 22 whose one end is connected in a single piece with the seal body 21; as well as a contact device 28 comprising a joining device 26 at the free end of the attachment device 22 and a connection device 27, arranged in the seal body 21. The wire conductor 25 is connected to a first contact surface 29 of the contact surface arrangement 24. In order to electrically connect the connection device 27 with the chip module 23 the connection device 27 establishes contact, by way of a further wire conductor 30, with a further contact surface 31 of the contact surface arrangement 24 of the chip module 23.

FIG. 2 shows the seal device 20 with the contact device 28 closed, wherein the electrically conductive joining device 26, provided on the end of the attachment device 22 or of the wire conductor 25, has been inserted in the connection device 27. In this configuration the wire conductor 25, together with the wire conductor 30 that has been electrically connected by way of the contact device 28, serves as an antenna device 32 which, apart from providing a circuit bridge that interconnects the contact surfaces 29 and 31 of the contact surface arrangement 24, forms a data transmission device for non-contacting connection of a reading device (not shown in detail in the drawing) with the data carrier formed by the chip (not shown in detail in the drawing) of the chip module 23. Furthermore, the antenna device 32 makes possible the energy supply necessary for the read-out procedure. A circuit design of the type mentioned above, comprising a chip module 23 and an antenna device 32 that establishes contact with the chip module 23, is generally referred to as a transponder.

FIG. 3, according to a further embodiment, shows a seal device 33 which, in a way that differs from the seal device 20 shown in FIGS. 1 and 2, comprises a chip module 34 that comprises a contact surface arrangement 35. Apart from the contact surfaces 29, 31, which, as has already been explained above with reference to FIGS. 1 and 2, establish contact with the wire conductors 25 and 30 respectively, the contact surface arrangement 35 comprises further contact surfaces 36, 37 which establish contact with contact ends 38, 39 of a further antenna device 40. Consequently, with the contact device 28 closed, the seal device 33 shown in FIG. 3 comprises two antenna devices 32 and 40, wherein the function of the antenna device 40 does not depend on whether the contact device 28 is open or closed. Furthermore, the function of the antenna device 40 does not depend on whether the circuit bridge that is formed by the wire conductor 25 in the attachment device 22 is closed or separated.

FIG. 4 is an enlarged view of the free end of the attachment device 22 shown in FIGS. 1 to 3 with the joining device 26 intended for insertion into the connection device 27 that is also shown in FIGS. 1 to 3. In the embodiment shown in FIG. 4 the attachment device 22 comprises the wire conductor 25 that is encased by insulating plastic sheathing 41 cast in one piece with the seal body 21 (FIGS. 1 and 2). In the present case the joining device 26 comprises an insertion cone 42 which by way of a crimp connection 43 is connected to a connection end 44 of the wire conductor 25.

FIGS. 5 and 6 show the insertion procedure to produce the contact device 28 (FIG. 5) which comprises the joining device 26 and the connection device 27, as well as the finished contact device 28 (FIG. 6). As shown in FIG. 5, the connection device 27, which is firmly encased, at least in part, in the seal body 21, for example by gluing, comprises a shape-elastic V-shaped connection housing 51, which is for example made of plastic. The connection housing 51 comprises two spreading limbs 46 that are set so as to be V-shaped in relation to each other and that at their free ends comprise snap-in clips 45. In a housing base 48, formed by interconnected base ends 47 of the spreading limbs 46, a conical contact 49 is arranged which is complementary in shape to the insertion cone 42, wherein the contact tip 50 of the conical contact 49 is connected to the wire conductor 30.

As shown in FIG. 5, inserting the insertion cone 42 of the joining device 26 into an insertion gap 52 formed between the snap-in clips 45 of the connection housing 51 causes the spreading limbs 46 to spread. When the insertion movement is continued the insertion cone 42 enters the conical contact 49, and the snap-in clips 45 that are formed on the ends of the spreading limbs 46 grip the rear snap-in end 53 of the insertion cone 42 due to the shape-elastic restoring forces of the spreading limbs 46.

As is shown in the depiction of the closed contact device 28 in FIG. 6, an annular space 34 formed after the insertion procedure between a shaft 54 of the insertion cone 42 and the snap-in clips 45 is dimensioned such that removal of the insertion cone 42 from the connection housing 51 after snap-in is not possible. Instead, a separation force 55 acting on the insertion cone 42 causes the free ends of the snap-in clips 45 to move until they come to rest against the shaft 54 so that withdrawal of the insertion cone 42 from the connection device 27 is not possible. If the separation force 55 exceeds a specified value, in the region of predetermined breaking points defined by connection curves 56 of the snap-in clips 45, component failure and thus disconnection of the connection occurs. Due to this component failure, it is not possible to restore the contact device 28.

FIGS. 7 to 10 diagrammatically show further embodiments of seal devices 59, 60, 61 and 62. The seal device 59 shown in FIG. 7 comprises a chip module 64, arranged in a seal body 63, which chip module establishes contact, by way of a first connection surface arrangement 65, with a joining conductor device 66, and, by way of a second connection surface arrangement 67, with an internal energy supply device 68, which is embodied as a battery. For data access to the chip (not shown in detail in the drawing), arranged in the chip module 64, the chip module 64 comprises a data access contact arrangement 69 that is arranged in the surface of the seal body 63 and that is accessible from the outside. The joining conductor device 66 is connected to a circuit bridge 71 that is closed by a contact device 70, which circuit bridge 71 is essentially arranged in an attachment device 72 formed on the seal body 63.

FIG. 8 shows the seal device 60 which comprises a chip module 74 arranged in the seal body 73, which chip module establishes contact with an antenna device 76 by way of a connection surface arrangement 75. The antenna device 76 is also arranged in the seal body 73; on the one hand it makes possible data access to the data stored in the chip (not shown in detail in the drawing) of the chip module 74, while on the other hand said antenna device 76 makes possible the energy supply of the chip from outside the seal body 73. Connected to the antenna device 76 is a circuit bridge 78 that essentially leads through an attachment device 77, which circuit bridge 78 when the contact device 70 is closed is integrated in a winding of the antenna device 76 so that with a suitable design it can improve the working range of the antenna device 76.

The seal device 61 shown in FIG. 9 comprises a chip module 80, arranged in a seal body 79, which chip module 80 is connected by way of a first connection surface arrangement 81 with an antenna device 82, and by way of a second connection surface arrangement 83 is connected with a circuit bridge 84 which when the contact device 70 is closed short-circuits the connection surfaces 85 and 86 of the connection surface arrangement 83 with each other.

In the seal device 61 shown in FIG. 9 both the data access function by way of an externally arranged reading device (not shown in detail in the drawing), which reading device communicates with the antenna device 82, and the energy supply function of the antenna device 82 are independent of the contact device 70 or of the integrity of the circuit bridge 84 which leads through an attachment device 87 of the seal device 61. In this way it is possible to read data, which can for example comprise product information or supply data relating to the object to which the seal device is affixed, from the chip of the chip module 80 even in those cases where the circuit bridge 84 due to separation or due to an open contact device 70 is not closed.

The seal device 62 shown in FIG. 10 comprises a chip module 88 which by way of a connection surface arrangement 89 establishes contact with a two-part antenna device 90 which for reasons relating to circuit technology comprises two antenna units 91 and 92 that are parallel connected. The antenna unit 91 comprises a circuit bridge 93 connected to an antenna winding, which circuit bridge 93 essentially leads through an attachment device 95 that is connected to the seal body 94. When the contact device 70 is closed, the antenna unit 91 thus operates in addition to the antenna unit 92. In the case of the contact device 70 being open or the circuit bridge 93 having forcefully been separated, only the antenna unit 92 operates. In this way a reduction in the signal strength of the antenna signal or a reduction in the working range of the antenna device 90 indicates that either the contact device 70 is not closed, or the circuit bridge 93 is separated. Even if the circuit bridge 93 has been separated, in the embodiment shown in FIG. 10 non-contacting data access to the chip module 88 by way of the antenna unit 92 at a correspondingly reduced distance between the seal device 62 and a reading device (not shown in detail in the drawing) is possible.

The invention claimed is:

1. A seal device comprising:
   a seal body comprising a data carrier and an antenna device, the data carrier being designed as a switching circuit; and
   an attachment device for the captive attachment of the seal body to an object to be sealed, one end of the attachment device being connected in a single piece with the seal body and another end of the attachment device comprising a joining device for joining to a connection device provided on the seal body;
   the switching circuit of the seal body including an external circuit bridge lead through the attachment device for connecting two connection points of the switching circuit, the external circuit bridge being an open or closed circuit depending on whether the attachment device is joined to the connection device;
   the antenna device being connected to the switching circuit to supply energy in a non-contact manner from outside the seal body to the switching circuit and to provide non-contact transmission of data from the switching circuit regardless of whether the external circuit bridge is an open or closed circuit.

2. The seal device according to claim 1, wherein the switching circuit comprises an integrated circuit, and the external circuit bridge comprises a wire-shaped conductor.

3. The seal device according to claim 1, wherein the external circuit bridge is connected in series with a second antenna device, the external circuit bridge being formed from a section of a winding of the second antenna device.

4. The seal device according to claim 3, wherein the external circuit bridge is formed from a section of a winding of the second antenna device.

5. The seal device of claim 3, wherein the external circuit bridge and the second antenna device are connected in parallel to the antenna device.

6. The seal device according to claim 1, wherein the joining device on the attachment device and the connection device on the seal body form a contact device designed as a snap-in connection device.

7. The seal device according to claim 6, wherein the contact device is a one-time joining device.

8. The seal device according to claim 7, wherein at least one of the joining device and the connection device comprises a deformation part.

9. The seal device according to claim 1, wherein the contact device is constructed as a non-separable connection.

10. The seal device according to claim 1, wherein the attachment device is constructed as a wire conductor.

11. The seal device according to claim 10, wherein in order to form the circuit bridge the attachment device comprises a multitude of electrically conductive fibers.

12. The seal device according to claim 1, wherein the attachment device is made from a single-piece extension of the seal body.

13. The seal device of claim 12, wherein the attachment device comprises a circuit bridge that is formed from a conductive plastic.

14. The seal device according to claim 13, wherein in order to form the circuit bridge the attachment device comprises a multitude of electrically conductive fibers.

15. The seal device according to claim 12, wherein in order to form the circuit bridge the attachment device comprises a multitude of electrically conductive fibers.

* * * * *